Dec. 20, 1938. A. DUKELOW ET AL 2,140,988
POWER SHOVEL
Filed July 26, 1937 6 Sheets-Sheet 1

Fig. 1.

Arthur Dukelow
Lee M. Alger
INVENTORS

BY
ATTORNEY.

Fig. 3.

Dec. 20, 1938. A. DUKELOW ET AL 2,140,988
POWER SHOVEL
Filed July 26, 1937 6 Sheets-Sheet 5

Arthur Dukelow
Lee M. Alger.
INVENTORS:
BY
ATTORNEY.

Patented Dec. 20, 1938

2,140,988

UNITED STATES PATENT OFFICE 2,140,988

POWER SHOVEL

Arthur Dukelow, Denver, and Lee M. Alger, Golden, Colo.

Application July 26, 1937, Serial No. 155,636

29 Claims. (Cl. 214—135)

This invention relates generally to excavating machines, and, more particularly, to the power shovel type of machine having a single motor as a source of power therefor, and, it has for its principal object to provide an improved construction and arrangement of cable, cable drums and a gear connection between one cable drum and a crowd shaft for shovel hoisting and crowding operations, respectively, and, it has for another object to overcome certain practical objections to, and defects in, the usual types of power shovels.

In the class of excavating machines, commonly called power shovels, a suitable mobile truck carries a house which is mounted on the truck for horizontal rotation in either direction. A boom is pivoted at one end to the front end of the floor of the house and swings horizontally with the house when the house is rotated to the left or right. The boom also swings vertically by cable connections with boom hoisting mechanism carried by the floor of the house. A dipper arm, or arms are mounted on a shipper shaft gear or gears, the shipper shaft being journaled on the boom. A dipper or shovel is suitably supported at the forward ends of the dipper arms known also as rack handles, and the shovel carries a bail provided with a cable sheave. There is also a hoist mechanism, including a hoist drum and cable for raising and lowering the dipper or shovel. The cable is anchored at one end to the hoist drum, and at its opposite end, after riding the shovel bail sheave to such elements as the boom, a drum or sheave mounted on the boom, the dipper bail, the dipper stick or handle, and to any part of the machine other than a second shovel hoist or booster drum co-axial with a shaft on which the usual hoist drum is mounted.

Anchoring of the opposite end of the hoisting cable to a second hoist drum is an important object of the present invention as it overcomes certain practical objections to, and defects in, present power shovel constructions. There is also what is known as crowd mechanism for projecting and retracting the dipper arms or shovel handles longitudinally thereof to outwardly thrust the dipper or shovel into material to be excavated and to retract same therefrom. Such mechanisms are known as chain crowd and independent cable crowd. With the chain crowd, there is associated directly therewith a brake drum, brake band, and operating parts, which under hard and stubborn digging conditions become hot and defective, resulting in shut downs which are costly, not only in repair expense, but in the loss of shovel operating time, as well as resulting in abuse to crowd clutch linings, hoisting cable breakage, severe shocks and strains to the machine as a whole, due to the fact that there is no boosting power available for the chain crowd. The chain crowd is the most desirable crowd mechanism, as there is no stretching, weakening or replacing of cable as with the independent cable crowd mechanism. To contribute booster power to the regular chain crowding mechanism, we directly gear connect the second shovel hoist drum with the regular chain crowd shaft. This feature of directly gear connecting a second hoist drum with the crowd shaft is an important feature of the present invention. It automatically adds boosting power to the regular chain crowd mechanism, and, thereby overcomes certain practical objections to, and defects in, present chain crowd mechanism.

Directly connecting the second hoist drum by means of gears to the crowd shaft delivers the necessary and required power when projecting the shovel and its sticks, or handles outwardly into hard or stubborn material to be excavated where but a single motor, of a given horse power, is employed as a source of power in power shovel construction.

With the present invention, there is plenty of power delivered by the present, or usual single motor employed in power shovel structures. In fact, there is now a reserve power not heretofore available. There is saving in gasoline consumption. Burnt out crowd brakes are eliminated altogether. Crowd clutch linings are of longer life. Breakage of hoisting cable due to old causes is eliminated and boosting power is added direct to the usual primary chain crowd power. A balanced crowd is effected, slack is automatically picked up in the hoisting cable, shocks and strains are reduced to a minimum throughout the entire machine mechanism resulting in a smooth, powerful and speedy operation of the shovel. Hoist line speed is automatically reduced in the operation of filling the shovel with material to be excavated. Greater power is available after the shovel has been filled, as a double hoisting action is applied to the shovel when hoisting the same with two hoist drums mounted co-axial with a single drive shaft. This all results in a complete and even distribution of power at the proper time of operation, easier operation of the machine, greater yardage moved, and with practically no choking down of the motor, which means quicker acceleration.

Thus, briefly, objects of the present invention may be summed up as the employment of two hoist drums mounted co-axially with a single driven hoist drum shaft, anchoring both ends of the hoisting cable to said drums, one end to one drum and the other, or return end to the second drum, providing the second drum with a large gear and providing the usual chain crowd shaft with a relatively smaller gear meshed with the large gear on the second hoist drum.

Other objects of the invention are to provide a power shovel which will be comparatively simple in construction, strong, durable, compact, highly efficient and reliable in use under the most severe excavating conditions such, for instance as in mountainous material as blasted rock, and similar stubborn material to excavate. We eliminate an independent crowd cable between a crowd shaft and a shovel handle, or handles. We eliminate the dead ending of one end of a hoist cable to a boom, or to the shovel handles. In certain types of power shovels we eliminate a complete brake on the crowd shaft of an independent chain crowd mechanism, or assembly.

All of the foregoing and still further objects and advantages of the present invention will appear and become apparent from a study of the following specification read in connection with the accompanying drawings, wherein like characters of reference denote corresponding parts throughout the several views, and wherein:—

The present invention has, as before stated, relation to power shovels, and, referring now to the drawings, the invention is clearly illustrated, in one embodiment thereof, as applied to a power shovel having a truck assembly of the usual or any preferred form, and designated, generally, as A, and, upon which is suitably mounted a house, known as a cab assembly designated, generally as B, for horizontal rotation in either direction by the usual mechanism, details of which need not be described, as they do not form a part of the present invention.

A suitable boom designated, generally as C, is pivotally connected, as at 1, in the usual manner to the front end of the floor 2 of the cab assembly C, so as to be raised and lowered by the usual draft mechanism on the cab floor, including a cable 3 which is suitably connected with the point of the boom C and controlled by the usual draft mechanism, details of which need not be described, as they do not form a part of the present invention.

A suitable shovel designated, generally as D, and of the usual dipper type having a handle, or handles 4, known as dipper sticks, and having rack teeth 5, engage pinions 6 on a shipper shaft 7 mounted transversely on the boom C, and included in, and controlled by the usual type of chain crowd mechanism for outwardly projecting the dipper sticks 4 and the shovel D connected thereto, and retracting the same, and such mechanism will be hereinafter more fully described as it is associated with the present invention.

The usual single source of power, or driving motor, designated generally as E, is of the usual multi-cylinder internal combustion engine type, and, it is arranged transversely of the floor of the cab at the rear end thereof. Various operative mechanisms and connections are provided whereby power from the motor is used to drive the cable hoist drum shaft designated 8, details of which mechanisms and all of the connections need not be fully described here as they form no part of the present invention. However, for the sake of clarity, the hoist drum shaft 8, in one embodiment, of power shovel of the usual type, is rotated counter-clockwise, looking at the machine toward the left hand side thereof, by means of a large gear 9 secured to one end thereof, and it is driven by a pinion 10 secured to the same end of a lower parallel shaft 11, which shaft 11 has a pinion 12 on its opposite end meshed on one side thereof with a gear 13 mounted on a shaft 14, which gear 13, in turn, is meshed with a pinion 15 on a parallel shaft 16, and, which shaft 16 is provided with a large gear 17 meshed with a pinion 18 secured to the crank-shaft 19 of the motor E.

The shaft 14, in this embodiment of a power shovel structure is part of what is known as a rotating clutch shaft assembly, and the shaft is stationary until picked up by one or the other of the clutches designated, generally as F and F' at opposite ends thereof, the left hand clutch F turning the shaft 14 counter-clockwise and the right hand clutch turning the shaft clockwise. Further detail of this shaft assembly, which is not fully shown, has to do with rotation in either direction of the cab assembly, and the boom hoist assembly, of which the cable 3 is a part, and as it forms no part of the present invention, further details need not be described.

The hoist drum shaft assembly, which is an important part of the present invention, will now be fully described.

The hoist drum shaft 8 heretofore mentioned is suitably mounted for counter-clockwise rotation and suitably mounted on the shaft 8 is the usual hoist drum 20 which is rotatable in either direction, and rotatable in one direction, that is counter-clockwise, by a suitable clutch designated generally as 21. A suitable brake designated generally as 22, acts when desired, against the drum of the clutch.

A second suitable hoist and crowd power booster drum 23, an important feature of the present invention, is mounted alongside of the hoist drum 20 co-axial with the hoist drum shaft 8 and will be known as the right hand hoist drum, while drum 20 will be known as the left hand hoist drum.

Figure 1:
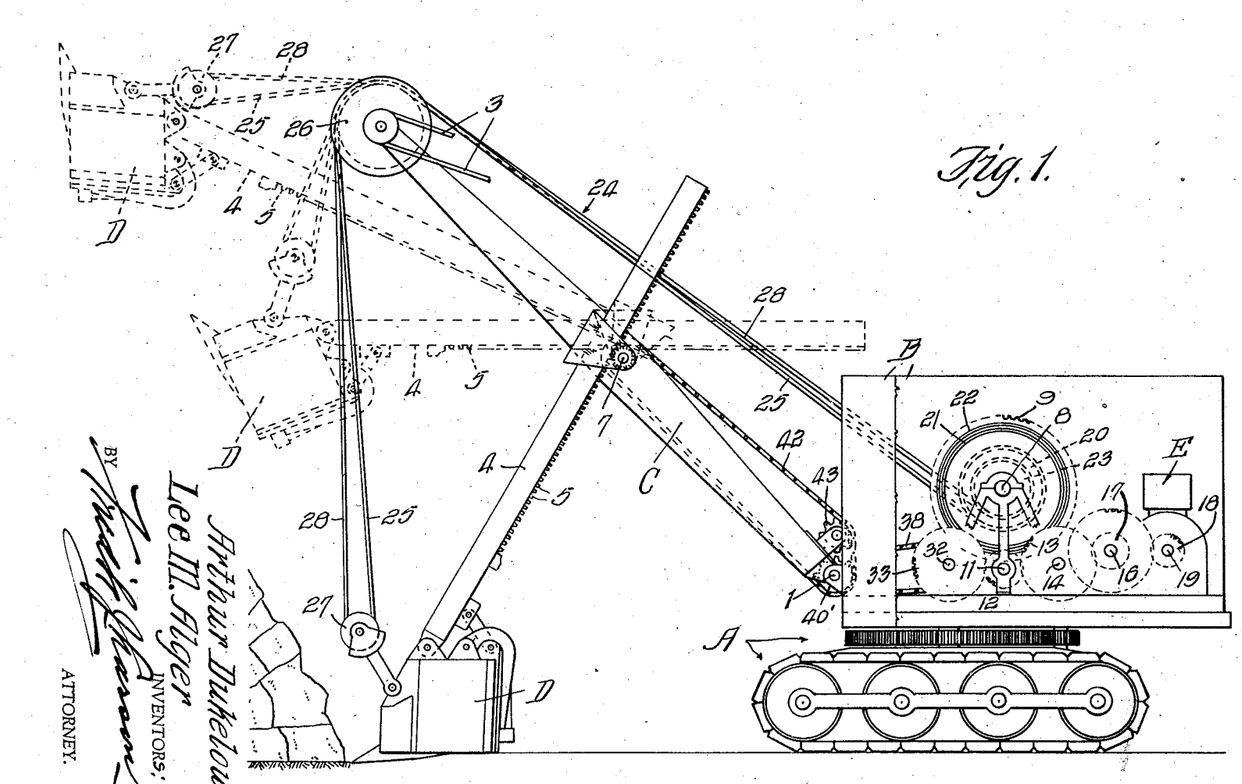
Fig. 1 is a side elevation of a power shovel embodying the invention.
Figure 2:
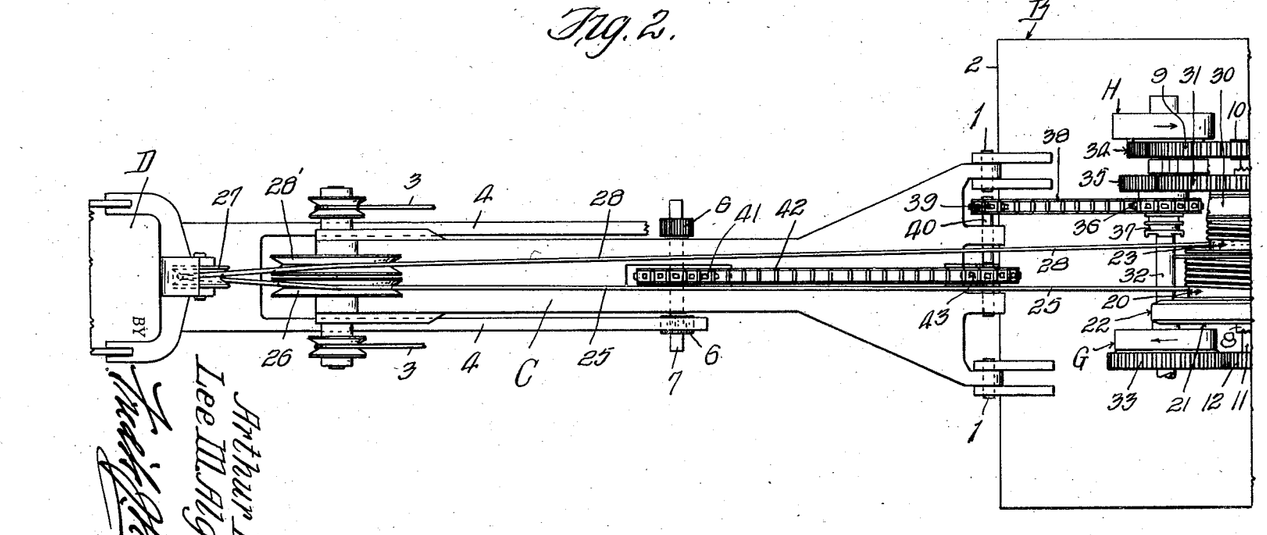
Fig. 2 is a top plan view more clearly illustrating the invention.
Figure 3:
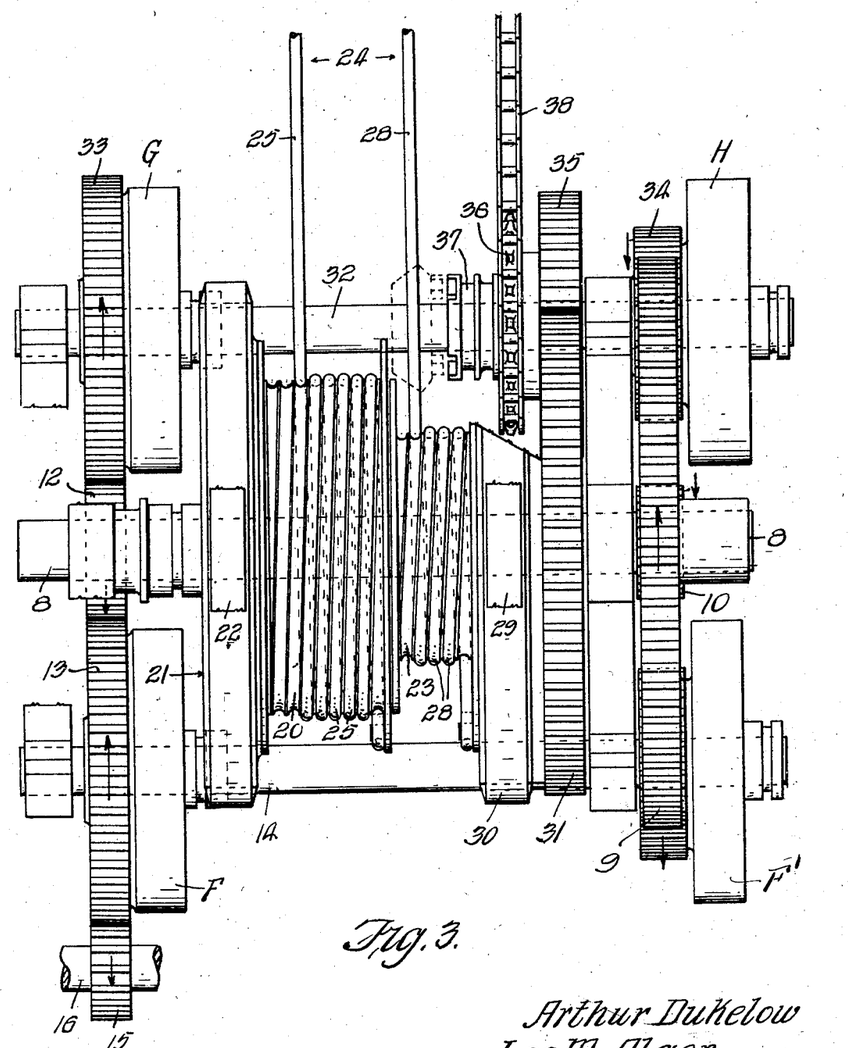
Fig. 3 is an enlarged top plan view of the hoisting and crowding mechanisms showing the invention as associated therewith, the boom and shovel being removed.
Figure 4:
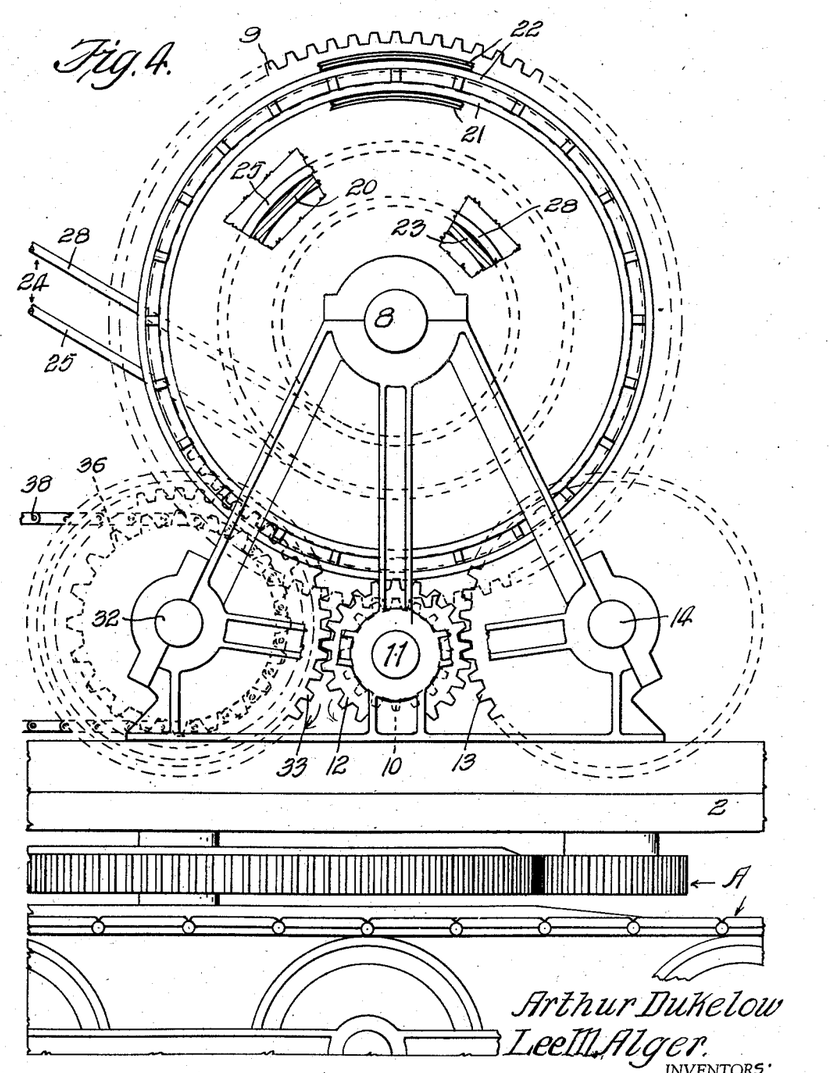
Fig. 4 is a left hand side elevation of Fig. 3.
Figures 5, 6:
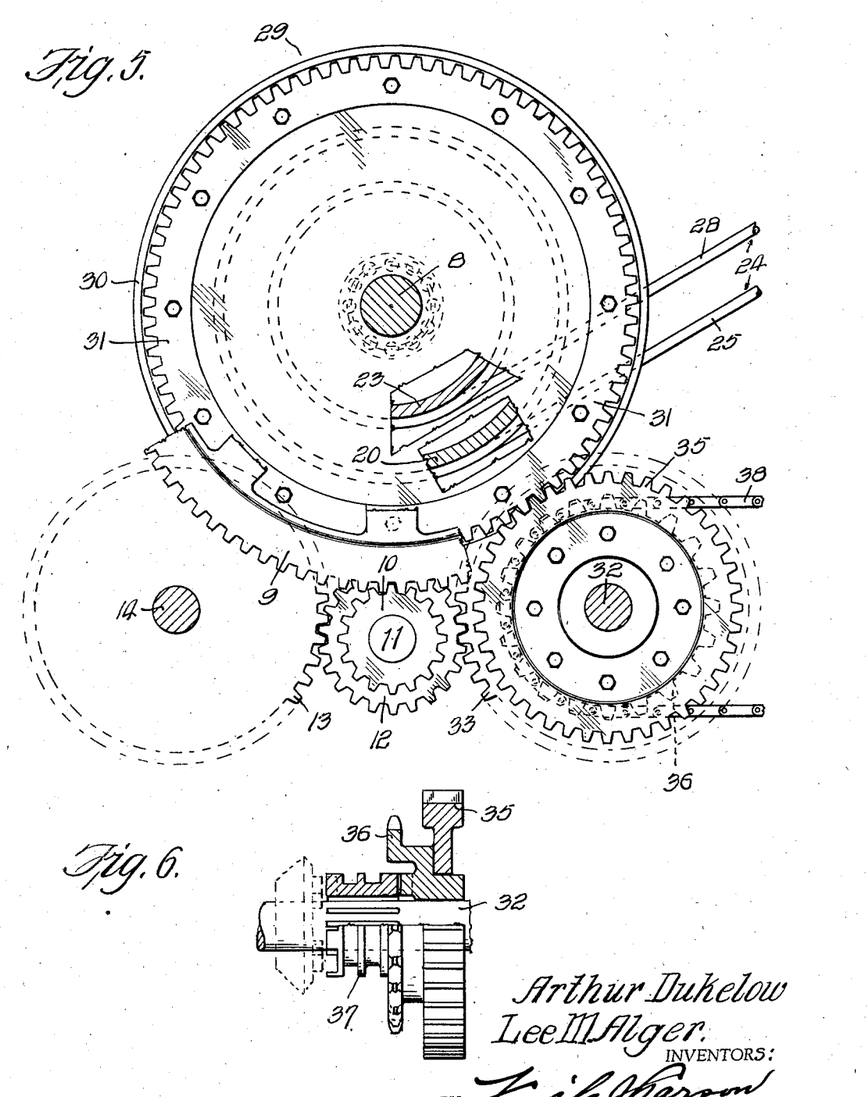
Fig. 5 is a right hand side elevation of Fig. 3, the cab floor and truck being removed.
Fig. 6 is a detail of the crowd shaft, combination sprocket and gear, and the sliding clutch.
Figure 7:
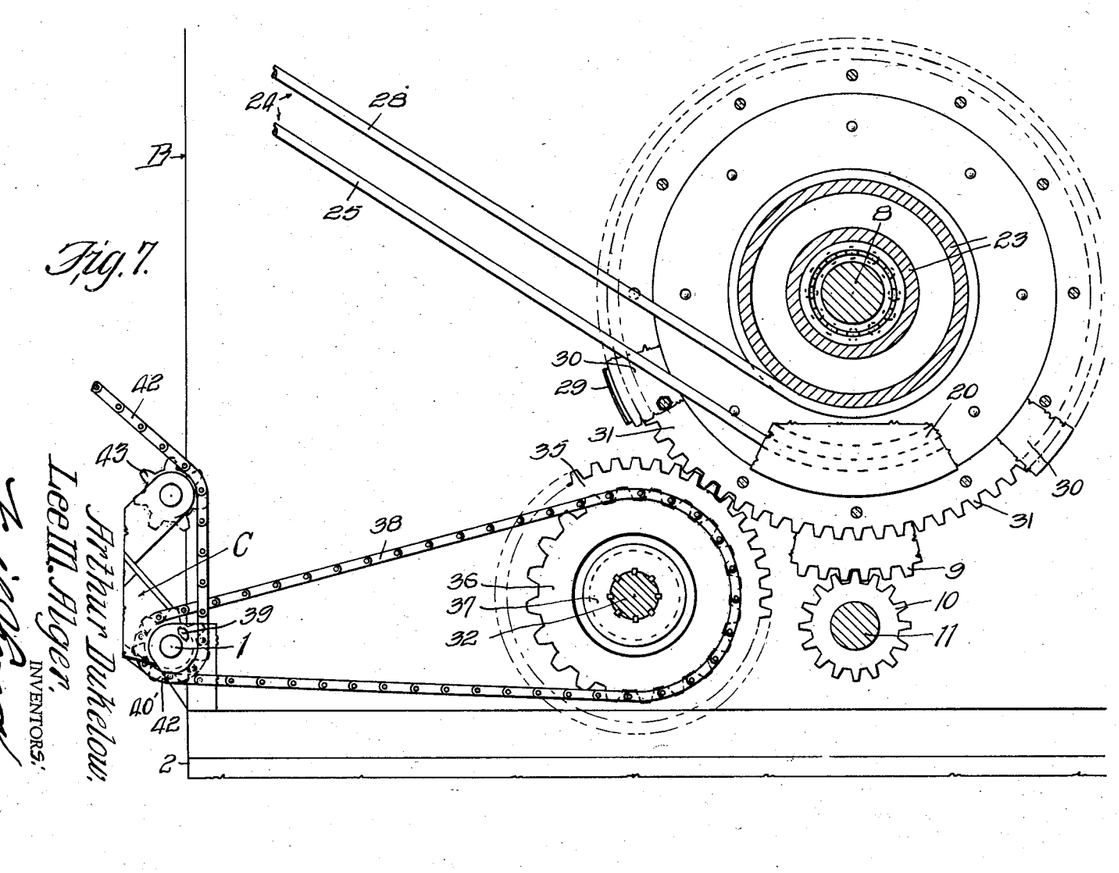
Fig. 7 is an enlarged right hand side elevation of the hoisting and crowd mechanisms with parts thereof removed and parts in section, and clearly showing the cable associated at its ends with both hoist drums and the gear connection between the second hoist drum and the crowd shaft.

The right hand hoist drum 23 is rotatable in either direction and positively rotated clockwise by pull of the shovel hoist cable, see Fig. 1, not yet described. The lead out action of the hoisting cable rotates the right hand hoist drum 23 clockwise, due to its live connections with a shovel bail sheave during longitudinal thrusting movement of the shovel through its handles.

This action on the right hand hoist drum contributes boosting crowd power directly to the primary chain crowd power, as will also be more fully described hereinafter.

Before describing the chain crowd mechanism, which is usual in present power shovel constructions, the shovel hoisting cable, which is an important part of the present invention, will first be described.

The hoisting cable, designated generally as 24, is anchored, at one end, to the left hand hoist drum 20 in the usual manner. Portion designated 25 of the hoist cable then leads to and over a boom point sheave 26, then it leads to and rides over a shovel bail sheave 27, and, from here what will be known as portion 28 of the cable leads to and over a second boom point sheave 28' and from there to the right hand hoist drum 23 to which it is anchored in the usual manner.

Thus, it will be clearly understood and apparent that in the present invention, a single continuous hoist cable is employed. The cable is anchored at its ends to its respective hoist drum mounted co-axial with the hoist drum shaft 8. The bend in the cable is intermediate its ends and live connected with the shovel bail sheave. Anchoring the return end of the hoist cable to a second hoist drum 20 on the hoist drum shaft is contrary to hoist cable connections in present types of power shovels. The return end portion 28 thereof, is usually dead ended to the boom, the dipper sticks or to other parts of the machine. Thus, in the present invention, both hoist drums 20 and 23 become main hoist drums. The shovel can be hoisted or lowered by either hoist drum, or both hoist drums, simultaneously, which is very important in the present invention. Only one hoist drum, however, is clutch controlled, but both hoist drums are brake controlled.

A suitable brake, designated generally as 29, is so designed as to act against a brake drum 30 secured to the right hand hoist drum 23, when desired, which will be apparent hereinafter.

Another important feature of the present invention is the employment of a large gear 31 secured to the right hand hoist drum 23, which will be fully apparent hereinafter. It has direct operative connection with the usual chain crowd mechanism for automatically boosting the initial or primary power thereof when crowding the shovel outwardly into material to be excavated. This arrangement further permits, if desired, hoisting with the left hand hoist drum to continue crowding in an upward arcuate path, distinguished from a purely outward crowding of the shovel due to the fact that cable can be released from the right hand hoist drum which continues to add boosting power through the large gear 31 on the right hand brake drum 30 secured to the right hand hoist drum 23. This feature will be more clearly apparent from the following detailed description of the chain crowd mechanism on the present type of power shovels.

The chain crowd mechanism, known as a crowd clutch assembly, and its connection with the right hand hoist drum 23 through the large gear 31, will now be described.

The reference numeral 32 designates the crowd shaft which is suitably mounted for selective rotation in either direction and it is disposed in advance of and below the hoist drum shaft 8. A gear 33, and a suitable friction clutch designated, generally, as G, is associated with the left hand end of the crowd shaft 32. The gear 33 is loosely mounted on the crowd shaft and the drum of the friction clutch G is secured thereto. The gear 33 is meshed with the pinion 12 on shaft 11 causing the gear 33 to continuously rotate counter-clockwise. A gear 34 and a suitable friction clutch designated generally as H, is associated with the right hand end of the crowd shaft 32. The gear 34 is also loosely mounted on the crowd shaft, and the drum of the friction clutch H is secured to rotate therewith. The gear 34 is meshed with the large gear 9 secured to the hoist drum shaft 8 causing the gear 34 to continuously rotate clockwise. The crowd shaft 32 is stationary until picked up by either clutch G, or clutch H. Detailed description of the crowd clutches G and H and the means for engaging and disengaging the same is not believed necessary as they are of the usual types used with crowd mechanism in power shovel constructions. The left hand clutch G when engaged, turns the crowd shaft counter-clockwise, and the right hand clutch H when engaged, turns the crowd shaft clockwise.

In lieu of the present crowd brake and its connections as in the present type of chain crowd assemblies, we employ a gear 35 loosely mounted on the crowd shaft 32 intermediate the crowd gears 34 and 33 and the gear 35 is meshed with the relatively large gear 31 secured to the right hand hoist drum 23. The gear 35, in its present embodiment, is preferably secured to rotate with a sprocket 36. A suitable sliding jaw clutch 37 keyed to the crowd shaft 32, which when engaged with the sprocket 36, and the crowd clutch G is engaged, makes the clutch available to furnish initial or primary power for rotating the crowd shaft 32 counter-clockwise for crowding the dipper handles outwardly to project the shovel into material to be excavated. In order to transmit the primary crowd shaft power to the shipper shaft, a chain 38 rides over sprockets 36 and 39, which latter sprocket is on a shaft 40 mounted in axial alignment with the boom pivot connections at the forward end of the cab floor. A second sprocket 40' is on the shaft 40 and there is a sprocket 41 on the shipper shaft, and over these sprockets another chain 42 rides, as well as riding over an idler sprocket 43.

When you crowd the shovel handles longitudinally to project the shovel into material to be excavated, help is secured from the right hand hoist drum 23, the large gear 31 and the crowd shaft gear 35. These elements together with the action of the hoisting cable anchored at its return end to the right hand hoist drum 23, while being fed therefrom, contributes booster power to boost the initial or primary crowd power delivered to the crowd shaft 32 from the pinion 12 on the driven shaft 11.

When you rack back, or retract the shovel handles, it is accomplished without help from the right hand hoist drum 23, the larger gear 31, the crowd shaft gear 35, or the action of the hoisting cable while being wound on the right hand hoist drum 23.

However, when end portion 28 of the hoisting cable is being wound on the right hand hoist drum 23 in hoisting the shovel, power for rotating the drum counter-clockwise is delivered through the crowd shaft gear 35 and the large gear 31 meshed therewith when clutch H is engaged. Power for rotating the left hand hoist drum 20 is furnished by the large hoist drum shaft gear 9 meshed with the pinion 10 on shaft 11 for winding the end portion 25 of the hoisting cable on the left hand hoist drum 20. It will be here clearly understood that the shovel is raised, preferably by first winding the end portion of the cable on the right hand hoist drum so as to store up a certain amount of cable and then the crowd shaft is made stationary to cease rotation of the right hand hoist drum and raising of the shovel is completed by rotation of the left hand hoist drum 20 clutched to the continuously driven hoist drum shaft 8. Both hoist drums 20 and 23 may be rotated simultaneously for winding the ends of the hoist cable thereon, if so desired. Thus, it is apparent that the hoist drums 20 and 23 may be rotated counter-clockwise independently of each other, or simultaneously, as desired by the operator of the machine.

The many advantages of the hereinbefore described invention will readily suggest themselves to those skilled in the art to which it appertains. For instance, a smooth and complete distribution of power, at the proper time of operation, is effected. Booster power is contributed to the crowd mechanism when most desirable, due to the direct gear connection between one of the hoist drums and the chain crowding mechanism. There is a great saving on crowd clutch lining. Certain jars and strains on the entire machine are eliminated. Increased yardage is handled. Easier operation of the machine is made possible when equipped with our present invention. Choking down of power from the single internal combustion engine is practically eliminated, thereby permitting quick acceleration when necessary. The engine is longer lived, and, there is a material saving in gasoline consumption. There is greater equalization of power and greater reserve power at instant disposal. A greatly improved, smoother and more powerful crowd power is available. It is possible to slope high banks without loss of crowd power. The present invention practically doubles the crowd braking power and without the usual brake on the crowd shaft. The dipper stick can be held in perfect balance in horizontal position.

When the invention is built into a machine at the factory, instead of rebuilt into present shovels remote from the factory, we eliminate one complete hoist drum friction clutch and control parts, and we eliminate the usual chain crowd shaft brake with its usual control parts.

While one desirable form of means is illustrated for boosting the primary crowd power, it is to be understood that the invention is not limited to the specific embodiment shown but that other and equivalent means may be employed in carrying the invention into effect.

What we claim is:

1. In a power shovel, the combination with a boom, a shovel, handles projecting rearwardly from the shovel mounted on the boom for rocking and shifting movements relative to the boom, a continuously driven hoist drum shaft, a brake controlled hoist drum mounted on said shaft and clutch connected therewith, of a reversible double clutch controlled chain crowd mechanism for projecting the shovel handles outwardly into material to be excavated and for retracting the same, a second hoist drum, brake controlled only, mounted co-axial with the hoist drum shaft, a shovel hoisting cable connecting the shovel with both shovel hoist drums, a pair of gears directly connecting the crowd mechanism with the second mentioned shovel hoist drum for contributing booster power to the power of the chain crowd mechanism when projecting the shovel outwardly and for rotating the said second shovel hoist drum when elevating the shovel during retracting movement of the shovel, and one of said gears being loosely mounted and independently clutch controlled.

2. In a power shovel, the combination with a boom, a shovel, handles projecting rearwardly from the shovel mounted on the boom for rocking and shifting movements relative to the boom, a continuously driven hoist drum shaft, a brake controlled hoist drum mounted on said shaft and clutch connected therewith, of a reversible double clutch controlled chain crowd mechanism for projecting the shovel handles outwardly into material to be excavated and for retracting the same, a second hoist drum, brake controlled only, mounted co-axial with the hoist drum shaft, a hoisting cable connecting the shovel with both hoisting drums, and a pair of gears directly connecting the second mentioned shovel hoisting drum with the crowding mechanism for contributing booster power to the primary power of the crowd mechanism when projecting the shovel into material to be excavated, and for rotating said second shovel hoisting drum to hoist the shovel while the shovel is being retracted.

3. In a power shovel, the combination with a boom, a shovel, handles projecting rearwardly from the shovel mounted on the boom for rocking and shifting movements relative to the boom, a continuously driven hoist drum shaft, a brake controlled hoist drum mounted on the shaft and clutch connected therewith, of a reversible double clutch controlled chain crowd mechanism for projecting the shovel handles outwardly into material to be excavated and for retracting the same, a second brake controlled hoist drum, brake controlled only, mounted co-axial with the hoist drum shaft, a hoisting cable connecting the shovel with both hoisting drums, a pair of gears directly connecting the second mentioned shovel hoisting drum with the crowding mechanism for contributing booster power to the primary power of the crowd mechanism when projecting the shovel into material to be excavated and for rotating said second shovel hoisting drum to hoist the shovel while the shovel is being retracted, and one of said gears being clutch controlled.

4. In a power shovel, the combination with a boom, a shovel, handles projecting rearwardly from the shovel mounted on the boom for rocking and shifting movements relative to the boom, a continuously driven hoist drum shaft, a brake controlled hoist drum mounted on said shaft and clutch connected therewith, of a reversible double clutch controlled chain crowd mechanism providing primary power for projecting the shovel handles outwardly into material to be excavated and for retracting the same, a second hoist drum, brake controlled only, mounted co-axial with the hoist drum shaft, a hoisting cable connecting the shovel with both hoisting drums, a pair of gears directly connecting the second mentioned shovel hoisting drum with the crowding mechanism for contributing booster power to the primary power of the crowd mechanism when projecting the shovel into material to be excavated and for rotating said second shovel hoisting drum to hoist the shovel while the shovel is being retracted, and one of said gears being controlled by means of a sliding clutch forming a part of the crowding mechanism to render the gears connecting the said second shovel hoist drum with the crowd mechanism either operative or inoperative.

5. In a power shovel, the combination with a boom, a shovel, handles projecting rearwardly from the shovel mounted on the boom for rocking and shifting movements relative to the boom, a continuously driven hoist drum shaft, a brake controlled hoist drum mounted on said shaft and clutch connected therewith, of a reversible double clutch controlled chain crowd mechanism for projecting the shovel handles outwardly into material to be excavated and for retracting the same, a second hoist drum, brake controlled only, mounted co-axial with the hoist drum shaft, a hoisting cable connecting the shovel with both hoisting drums, a pair of gears directly connecting the second mentioned shovel hoisting drum with the crowding mechanism for contributing booster power to the primary power of the crowd mechanism when projecting the shovel into material to be excavated and for rotating said second shovel hoisting drum to hoist the shovel while the shovel is being retracted and completing the shovel hoisting operation by rotation of the brake and clutch controlled hoist drum.

6. In a power shovel, the combination with a boom, of two main hoist drums mounted on a continuously driven hoist drum shaft, a shovel carried at the outer ends of shovel handles mounted for rockable and longitudinal shifting movements on the boom, double clutch controlled crowding mechanism for moving the shovel handles outwardly to project the shovel into material to be excavated and for retracting the same, a hoisting cable associated with both hoist drums and the shovel, two piece driving means connecting one of the hoist drums with the crowding means for automatically boosting the power of the crowding mechanism when outwardly projecting the shovel into the material to be excavated and for automatically rotating said last mentioned hoist drum for hoisting the shovel alone or together with the other drum.

7. In a power shovel, a boom, a shovel, handles on the shovel mounted for rocking and longitudinal movements in either direction on the boom, of a continuously driven hoist drum shaft, shovel hoisting means including a hoist drum associated with said hoist drum and the shovel, reversible clutch driven crowding mechanism for moving the shovel handles outwardly for projecting the shovel into material to be excavated and retracting the same, and driving means connecting said hoist drum with the crowding mechanism to automatically deliver boosting power to the crowding mechanism during outward movement of the shovel handles and to rotate said hoist drum during retracting movement of the shovel handles for hoisting the shovel.

8. In a power shovel, the combination with a boom, a shovel having handles mounted for rocking outwardly and inwardly projecting movement relative to the boom, of a hoist drum assembly including two drums, a double clutch controlled crowd shaft assembly, a cable associated with both hoist drums and the shovel, a large gear associated with one of the hoist drums, a relatively small gear associated with and clutch connected with the crowd shaft assembly, said gears automatically delivering boosting power to the crowd shaft assembly when moving the shovel handles outwardly to project the shovel into material to be excavated and automatically delivering power to said one hoist drum when retracting the shovel handles and the shovel for hoisting the shovel and for the rewinding of cable thereon preparatory for making another outward movement of the shovel handles, and means for driving the other hoist drum simultaneously with the gear driven hoist drum after the ceasing of driving of the gear driven hoist drum.

9. In a power shovel, the combination with a boom, a shovel having handles mounted for rocking and longitudinal shifting movements relative to the boom, a hoist drum assembly having the usual clutch controlled hoist drum, a hoisting cable associated with the hoist and the shovel and dead ended at one end to said hoist drum, and a double clutch controlled chain crowd mechanism for moving the shovel handles and the shovel outwardly into material to be excavated, of a second brake controlled hoist drum associated with the first hoist drum in co-axial relation therewith, the opposite end of said hoisting cable being dead ended to the second drum, a two gear connection between the second hoist drum and the crowd mechanism for delivering boosting power to the crowding mechanism while moving the shovel handles outwardly and driving the second hoist drum while retracting the shovel handles to rewind cable thereon preparatory to another crowding operation and said second hoist drum being driven counter-clockwise with or independent of the first mentioned hoist drum.

10. In a power shovel, the combination with a cable hoisting mechanism including a clutch and brake controlled hoist drum and a single hoisting cable anchored at one end thereto and live connected to a dipper type shovel, and a reversible double clutch controlled chain type crowding mechanism associated with the dipper type shovel which is mounted on a boom and movable relative thereto, of a second brake controlled hoist drum mounted co-axially with the first mentioned hoist drum and to which second hoist drum the other end of the hoisting cable is anchored, the bend in the cable being live connected with the shovel, a clutch controlled gear rotatable with a chain sprocket of the crowding mechanism, and a relatively large gear on the second hoist drum meshed with said clutch controlled gear.

11. In a power shovel, a boom, a dipper type shovel, a reversible double clutch controlled chain crowd mechanism for outwardly projecting and retracting the shovel with respect to the boom, said crowd mechanism including a clutch controlled combined sprocket and gear, a pair of hoist drums mounted on a driven shaft in side by side relation, one of said drums being both clutch and brake controlled, the second of said drums being brake controlled, a large gear on the second drum meshed with the gear combined with the sprocket, and a hoisting cable dead ended to said hoist drums and live connected with the shovel.

12. In a power shovel, the combination with a boom, shovel handles mounted on a shipper shaft assembly carried on the boom to move the handles longitudinally and to rock the handles with respect to the boom, of crowding means for moving said handles longitudinally in both directions, a shovel on the handles, a shovel hoisting cable anchored at its ends to two hoist drums co-axial with a driven shaft after riding over a shovel bail sheave, and means connecting one of said drums with said crowding means for boosting the initial crowd power for moving the shovel handles outwardly to project the shovel into material to be excavated and said crowd power boosting means rotating said last mentioned hoist drum when hoisting the shovel.

13. In a power shovel, the combination with a boom, shovel handles mounted on a shipper shaft assembly carried on the boom to move the handles longitudinally and to rock the handles with respect to the boom, of crowding means for moving said handles longitudinally in both directions, a shovel on the handles, a shovel hoisting cable anchored at its ends to two hoist drums co-axial with a driven shaft after riding over a shovel bail sheave, and drive means associated with one of the hoist drums, which, when cable is being unwound from the drum boosts the initial crowd power outwardly thrusting the shovel handles, and which drive means is reversibly driven by the crowd means for rotating said last mentioned hoist drum when hoisting the shovel.

14. In a power shovel, the combination with a boom, a shipper shaft, a pinion on the shipper shaft, a shovel and handle therefor, the handle being mounted to rock with respect to the boom, a rack on the handle meshing with said pinion, means for driving the shipper shaft to move the shovel handle longitudinally in either direction, a hoist drum shaft, two main hoist drums mounted co-axial with the hoist drum shaft, a shovel hoisting cable anchored at its ends to said drums and live connected intermediate its ends to a shovel bail sheave, and drive means associated with one of said hoist drums which when the cable is being unwound therefrom delivers booster power to the means for driving the shipper shaft during outward projecting movement of the shovel handle and said booster drive means being driven by said means for driving the shipper shaft when winding cable thereon during hoisting movement of the shovel.

15. In a power shovel, the combination with a boom, a shipper shaft, a pinion on the shipper shaft, a shovel and handle therefor, the handle being mounted to rock with respect to the boom, a rack on the handle meshing with said pinion, means for driving the shipper shaft to move the shovel handle longitudinally in either direction, a hoist drum shaft, two main hoist drums mounted co-axial with the hoist drum shaft, a shovel hoisting cable also associated with said shovel and said main hoist drums to cause one of the main hoist drums to deliver booster power through drive means to the means for driving the shipper shaft pinion during outward thrusting movement of the shovel handle and to drive said drive means for winding cable on said last mentioned main hoist drum when hoisting the shovel.

16. In a power shovel, the combination with a cab floor and a boom hingedly projecting therefrom, of a shovel handle mounted to rock with respect thereto, a shovel on the outer end of the handle, a rack on the handle, a pinion mounted on the boom meshed with the rack for moving the shovel handle longitudinally in either direction, primary crowd means on the cab floor operatively connected with the pinion for driving the pinion in either direction, a pair of main hoist drums mounted co-axial with a drive hoist drum shaft, a hoisting cable associated with said hoist drums and the shovel for delivering booster power through one of the hoist drums and drive means connecting said hoist drum with the primary crowd means when thrusting the shovel handle outwardly to project its shovel into material to be excavated, and said crowd means delivering power to said driven means which in turn delivers power to said last mentioned main hoist drum when hoisting the shovel.

17. In a power shovel, the combination with a cab floor and a boom pivoted at one end thereto, so as to project therefrom, of a stick having a rack, a shovel on the outer end of the stick, a shipper shaft, a pinion on the shipper shaft meshing with the rack permitting the stick to rock thereon, a sprocket on the shipper shaft, three sprockets on the boom, a crowd shaft mounted on the cab floor, a sprocket on the crowd shaft, two chains operatively connecting said sprockets, clutch controlled driving means at opposite ends of said crowd shaft to selectively drive the crowd shaft in opposite directions to move the stick in opposite directions, a pair of main hoist drums mounted co-axial with a driven shaft, a shovel hoisting cable associated with both main hoist drums and the shovel, gear connections between one of the hoist drums and the crowd shaft sprocket to deliver booster power to the crowd shaft and through the chains to the shipper shaft when outwardly thrusting the stick to project the shovel into material to be excavated and to deliver power from the crowd shaft to the last mentioned hoist drum when hoisting the shovel.

18. In a power shovel having, in combination, a pair of co-axially mounted hoist drums, a boom, a shovel, and shovel sticks mounted for movements relative to the boom, a crowd mechanism adjacent the hoist drums including a reversible double clutch controlled crowd shaft, a hoisting cable dead ended at its ends to the hoist drums and live connected with the shovel, a large gear on one of the hoist drums and a relatively smaller gear mounted on the crowd shaft and meshed with said large gear, and said relatively small gear being clutch connected with the crowd shaft.

19. In a power shovel, the combination with a supporting boom and a dipper having a cable sheave bail and handles mounted on the boom to move longitudinally and to swing with respect to the boom, of means for moving the dipper handles longitudinally in either direction comprising a reversible crowd shaft optionally gear connected at opposite ends through suitable connections, a shipper shaft having a pinion thereon and sprocket and chain connections between the crowd shaft and shipper shaft to supply primary power to turn the shipper shaft counterclockwise to crowd the dipper outwardly into material to be excavated, a reversibly mounted hoist drum, a second reversibly mounted hoist drum, said hoist drum being co-axial with a hoist drum shaft, a dipper hoist cable anchored at its ends to the hoist drum and live connected with the dipper bail sheave, and means connecting one of the hoist drums with the crowd shaft to boost the primary crowd power to the shipper shaft through clockwise rotation imparted to both hoist drums by the unwinding of both ends of the hoisting cable simultaneously therefrom during outward thrusting movement of the dipper.

20. In a power shovel, the combination with a supporting boom and a dipper having a cable sheave bail and handles mounted on the boom to move lonigtudinally and to swing with respect to the boom, of means for moving the dipper handles longitudinally in either direction comprising a reversible crowd shaft optionally gear connected at opposite ends through suitable connections, a shipper shaft having a pinion thereon and sprocket and chain connections between the crowd shaft and shipper shaft to supply primary power to turn the shipper shaft counter-clockwise to crowd the dipper outwardly into material to be excavated, a reversibly mounted hoist drum, a second reversibly mounted hoist drum, said hoist drum being co-axial with a hoist drum shaft, a dipper hoist cable anchored at its ends to the hoist drum and live connected with the dipper bail sheave, and a gear connection between the second hoist drum and the crowd shaft to boost the crowd power to the shipper shaft due to unwinding of the cable from both hoist drums which imparts clockwise rotation to said hoist drums and clockwise and counter-clockwise rotation to the gear connection between the second hoist drum and the crowd shaft for increasing the primary crowd power.

21. In a power shovel, the combination with a boom, of a shovel and a handle therefore with the handle mounted on the boom for rocking and longitudinal movement relative thereto, chain crowd mechanism for initially and positively moving said shovel handle longitudinally in both directions, a pair of independently or simultaneously operable hoist drums co-axial with a common continuously driven shaft, a shovel hoisting cable associated with both hoist drums and the shovel, and means associated with one of said hoist drums and the chain crowd mechanism for delivering positive boosting power to the chain crowd mechanism during outward thrusting movements of the shovel handle, and for positively rotating the said one hoist drum during hoisting movements of the shovel.

22. In a power shovel, the combination with a boom, of a shovel and handles therefor with the handles mounted on the boom for rocking and longitudinal movements relative thereto, a pair of reversible co-axial hoist drums mounted upon a common continuously driven shaft, a shovel hoist cable associated with both hoist drums and the shovel, and means driven by one of said hoist cables during outward movement of the shovel handles for positively boosting the power of the chain drive mechanism, and for rotating the said one hoist drum during retracting movements of the shovel handles.

23. A power shovel having, in combination, a continuously driven hoist drum shaft, a left hand hoist drum mounted on said shaft, said drum being brake and clutch controlled, a right hand hoist drum co-axial with said shaft, said right hand drum being brake controlled only, a shovel, a shovel hoist cable connecting the shovel with both hoist drums, a large gear secured to the right hand hoist drum, a reversible independently double clutch controlled chain crowd shaft, and a relatively small independently clutch controlled crowd shaft gear in mesh with said large gear to directly connect the right hand hoist drum with the chain crowd shaft for contributing booster power to the chain crowd shaft when rotating in one direction only and for rotating the said second hoist drum when rotating in the opposite direction.

24. In combination, a boom, a pair of sheaves on the point of the boom, a shovel having rack handles mounted on the boom, chain crowd mechanism for delivering primary power to longitudinally move the shovel handles in either direction, a pair of hoist drums mounted co-axial with a common continuously driven shaft, a cable associated with both hoist drums, the boom sheaves and the shovel and anchored at its ends to said hoist drums, and means associated with one of the hoist drums and the chain crowd mechanism for delivering booster power to the chain crowd mechanism when moving the shovel handles outwardly to force the shovel into material to be excavated, and for transferring power from the chain crowd mechanism to said other hoist drum when retracting the shovel handles for imparting initial hoisting movement to the shovel, and means for driving the first mentioned hoist drum for simultaneously aiding in the shovel hoisting movement and independently hoisting the shovel after retracting movement of the shovel handles has ceased.

25. In combination with a shovel, a chain crowd mechanism including an independent reversible double clutch controlled shaft and a continuously driven hoist drum shaft, of a pair of hoist drums mounted co-axial with the hoist drum shaft, one hoist drum being brake and clutch controlled and the other drum being brake controlled only, a hoisting cable connecting the shovel with both hoist drums and leading off from the undersides thereof, of gears directly connecting the hoist drum that is brake controlled only with the crowd shaft for contributing booster power to the primary crowd power when projecting the shovel into material to be excavated, and for rotating said last mentioned hoist drum when the shovel is being initially elevated prior to the brake and clutch controlled hoist drum becoming operative to complete the shovel hoisting operation.

26. In a power shovel, the combination with a boom, a dipper type shovel mounted on the boom, a shovel, a hoist drum, a hoist cable associated with the shovel and connected at one end thereof to the hoist drum, and a crowd mechanism for dipper type shovel, of a second hoist drum, said hoist cable being connected at its opposite end to the second hoist drum permitting the shovel to be raised by either drum or simultaneously by both drums, a large gear on the second hoist drum, and a relatively small gear associated with the crowd mechanism and meshed with the large gear to boost the crowd power when moving the shovel into material to be excavated and for rotating the second drum when raising the shovel thereby.

27. In a power shovel, the combination with a boom, and a pair of hoist drums, of a shovel having handles mounted on the boom for rocking and longitudinal movements relative to the boom, a hoist cable associated with the shovel and each hoist drum, means for crowding the handles outwardly to project the shovel into material to be excavated, means connecting one of the hoist drums with the crowding means to deliver boosting power to the crowding means during crowding operation and to deliver power from the crowding means to said last mentioned hoist drum for hoisting the shovel during retracting movement of the shovel handles, and a continuously driven shaft clutch connected with the other drum for hoisting the cable simultaneously with said last mentioned drum, and independently of said last mentioned drum after the handles have been retracted to the desired position.

28. A hoisting shovel having, in combination, hoisting mechanism including a continuously driven shaft, a clutch and brake controlled hoist drum mounted on said shaft, a brake controlled hoist drum mounted on said shaft, a boom supported dipper type shovel, a cable associated with both hoist drums for hoisting the shovel independently of each other or together, a double clutch controlled crowd mechanism including a crowd shaft, a clutch controlled combination gear and sprocket mounted on the crowd shaft, and a relatively large gear on one of the hoist drums meshed with the gear of the combination gear and sprocket for boosting the primary crowd power when moving the shovel outwardly into material to be excavated and for rotating the gear equipped hoist drum when moving the shovel inwardly.

29. A power shovel having, in combination, a primary crowd mechanism including a reversible double clutch controlled crowd shaft, a sprocket mounted in the crowd shaft, a boom, a shipper shaft on the boom, a sprocket on the shipper shaft, a sprocket shaft at the base of the boom, a pair of spaced sprockets on said sprocket shaft, a chain riding over one of the sprockets on the sprocket shaft and the sprocket on the shipper shaft, a chain riding over the other sprocket on the sprocket shaft and the sprocket mounted on the crowd shaft, a sliding clutch for engagement and disengagement with the sprocket on the crowd shaft, a small gear mounted on the crowd shaft and secured to the crowd shaft sprocket to rotate therewith, a continuously driven shaft, a brake controlled hoist drum mounted on the driven shaft, a large gear secured to said hoist drum and meshed with said small gear, a clutch and brake hoist drum mounted on said shaft, and a shovel hoisting cable connecting the shovel with both hoist drums.

ARTHUR DUKELOW.
LEE M. ALGER.